United States Patent
Van Belzen et al.

(10) Patent No.: US 11,578,009 B2
(45) Date of Patent: *Feb. 14, 2023

(54) UREA-BASED BLEND COMPOSITION AND METHOD FOR THE MANUFACTURE THEREOF

(71) Applicant: YARA INTERNATIONAL ASA, Oslo (NO)

(72) Inventors: Ruud Van Belzen, Middelburg (NL); Filip Colpaert, Zwijnaarde (BE)

(73) Assignee: YARA INTERNATIONAL ASA, Oslo (NO)

( * ) Notice: Subject to any disclaimer, the term of this patent is extended or adjusted under 35 U.S.C. 154(b) by 219 days.

This patent is subject to a terminal disclaimer.

(21) Appl. No.: 17/053,330

(22) PCT Filed: May 9, 2019

(86) PCT No.: PCT/EP2019/061894
§ 371 (c)(1),
(2) Date: Nov. 5, 2020

(87) PCT Pub. No.: WO2019/215271
PCT Pub. Date: Nov. 14, 2019

(65) Prior Publication Data
US 2021/0070669 A1    Mar. 11, 2021

(30) Foreign Application Priority Data
May 9, 2018    (EP)    .................................... 18171374

(51) Int. Cl.
*C05C 9/00*    (2006.01)
*C05G 5/30*    (2020.01)
(Continued)

(52) U.S. Cl.
CPC ................ *C05C 9/005* (2013.01); *C05D 5/00* (2013.01); *C05D 9/00* (2013.01); *C05G 1/00* (2013.01);
(Continued)

(58) Field of Classification Search
None
See application file for complete search history.

(56) References Cited

U.S. PATENT DOCUMENTS 3,785,796 A    1/1974  Mann, Jr.
4,530,714 A    7/1985  Kole et al.
(Continued)

FOREIGN PATENT DOCUMENTS

CN    103896672 A    7/2014
CN    103896673 A    7/2014
(Continued)

OTHER PUBLICATIONS

"Guidance for the compatibility of fertilizer blending materials" by EFMA, Brussels, Belgium, Jun. 2006. 16 pages.
(Continued)

*Primary Examiner* — Wayne A Langel
(74) *Attorney, Agent, or Firm* — Dilworth IP, LLC

(57) ABSTRACT

The invention relates to a particulate urea-based blend composition comprising a urea-based compound in particulate form and one or more components in particulate form, selected from the group of nitrates, phosphates, sulphates and chlorides, and a urease inhibitor of the type phosphoric triamide, and a magnesium sulphate, wherein the urea-based blend composition is further characterized in that it comprises an alkaline or alkaline-forming compound, selected from the group of calcium oxide, zinc oxide, magnesium oxide, calcium carbonate, and mixtures thereof. The composition according to the invention has improved properties (Continued)

for reducing ammonia loss by urease activity in the soil and is in particular suitable as a fertilizer. The invention further relates to a method for the manufacture of said urea-based blend composition, as well as to a composition of kit of parts comprising an amount of a) magnesium sulphate; b) a urease inhibitor of the type phosphoric triamide, preferably N-(n-butyl) thiophosphoric triamide (nBTPT); c) an alkaline or alkaline-forming compound, selected from the group of calcium oxide, zinc oxide, magnesium oxide, calcium carbonate, and mixtures thereof, and d) optionally, one or more anti-caking and/or moisture-repellent and/or anti-dust compounds.

27 Claims, 3 Drawing Sheets

(51) Int. Cl.
| | | |
|---|---|---|
| C05G 3/30 | (2020.01) | |
| C05G 3/20 | (2020.01) | |
| C05G 3/90 | (2020.01) | |
| C05D 1/00 | (2006.01) | |
| C05D 9/00 | (2006.01) | |
| C05G 1/00 | (2006.01) | |
| C09K 15/02 | (2006.01) | |
| C05D 5/00 | (2006.01) | |
| A23K 20/24 | (2016.01) | |
| A23K 20/26 | (2016.01) | |
| A23K 40/30 | (2016.01) | |
| A23K 20/105 | (2016.01) | |

(52) U.S. Cl.
CPC .............. *C05G 3/20* (2020.02); *C05G 3/30* (2020.02); *C05G 3/90* (2020.02); *C05G 5/30* (2020.02); *C09K 15/02* (2013.01); *A23K 20/105* (2016.05); *A23K 20/24* (2016.05); *A23K 20/26* (2016.05); *A23K 40/30* (2016.05)

(56) References Cited

U.S. PATENT DOCUMENTS

| | | |
|---|---|---|
| 5,352,265 A | 10/1994 | Weston et al. |
| 11,332,412 B2 * | 5/2022 | Van Belzen ............. C05G 5/10 |
| 2015/0052960 A1 | 2/2015 | Makin et al. |

FOREIGN PATENT DOCUMENTS

| | | |
|---|---|---|
| CN | 103524221 B | 6/2015 |
| CN | 104860775 A | 8/2015 |
| CN | 106069441 A | 11/2016 |
| CN | 106588372 A | 4/2017 |
| EP | 0768993 B1 | 4/1997 |
| WO | 9212633 A1 | 8/1992 |
| WO | 9965845 A1 | 12/1999 |
| WO | 2006004424 A1 | 1/2006 |
| WO | 2006093413 A1 | 9/2006 |
| WO | 2014009326 A1 | 1/2014 |
| WO | 2017005695 A1 | 1/2017 |
| WO | 2017042194 A1 | 3/2017 |
| WO | 2017081183 A1 | 5/2017 |
| WO | 2017168288 A1 | 10/2017 |
| WO | 2018069456 A1 | 4/2018 |
| WO | WO 2018/069486 * | 4/2018 ............. C05C 9/005 |

OTHER PUBLICATIONS

Search Report Issued in International Application No. PCT/EP2019/061641, dated Aug. 27, 2019, 4 pages.
Search Report Issued in International Application No. PCT/EP2019/061894, dated Aug. 27, 2019, 3 pages.
Search Report Issued in International Application No. PCT/EP2019/062036, dated Aug. 30, 2019, 3 pages.

* cited by examiner

UREA-BASED BLEND COMPOSITION AND METHOD FOR THE MANUFACTURE THEREOF

FIELD OF THE INVENTION

This invention relates to a particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT), with improved properties for reducing ammonia loss by urease activity in the soil. The invention further relates to a method for the manufacture of a particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT). The product is in particular suitable as a fertilizer.

BACKGROUND OF THE INVENTION

Urea is the most common nitrogen-containing fertilizer. Urea has the highest nitrogen content of all nitrogen-containing fertilizers in common use (46%). Its consumption worldwide has been considerably increased, from about 20 million tons in the early seventies to about 100 million tons at the beginning of the twenty first century. Nitrogen is a basic element for any living system as a constituent of protein.

Urea is often used as such, but also as a component of a particulate blend, i.e. a physical blend or bulk blend, containing additional (primary and secondary nutrient) elements, such as potassium, phosphor, nitrogen and sulphur to obtain a particulate NPK(S), NP(S) or NK(S) blend, and other elements such as magnesium and calcium (secondary nutrients). In that respect, urea can easily be blended with, for example, potassium sulphate (sulphate of potash, SOP) and potassium magnesium sulphate (sulphate of potash magnesia). Urea can also be blended with sodium nitrate (Chilean nitrate 16-0-0), ammonium sulphate (sulphate of ammonia), urea ammonium sulphate (UAS), mono ammonium phosphate (MAP), di-ammonium phosphate (DAP), rock phosphate, potassium chloride (muriate of potash, MOP) and urea calcium nitrate (UCAN).

In some cases, particulate urea can hardly be mixed and stored as a blend with certain chemicals due to hygroscopic double salt formation or release of crystal water, but can be mixed, and co-applied shortly after, with calcium nitrate, ammonium nitrate, calcium ammonium nitrate or limestone ammonium nitrate, ammonium sulphate nitrate, potassium ammonium nitrate (nitropotash), superphosphate, and triple superphosphate (TSP). A more detailed list can be found in "Guidance for the compatibility of fertilizer blending materials" by EFMA, Brussels, Belgium, June 2006.

Furthermore, urea particles can be "doped" or coated with elemental sulphur to supply sulphur, or indirectly sulphates, to the soil, preferably in sulphur-deficient soils.

Unfortunately, urea nitrogen cannot be assimilated directly by the plants and needs to be converted through hydrolysis into ammonium and nitrification into nitrate. Urea is first hydrolysed in the soil under the action of an enzyme, commonly called urease, to produce ammonia and carbon dioxide. Ureases are found in numerous bacteria, fungi, algae, plants and some invertebrates, as well as in soils, as a soil enzyme. Urea hydrolysis tends to increase the pH of its environment as the ammonia is dissolved into the water in the soil, and part of the ammonia can also be released into the atmosphere, a process called ammonia volatilization, thus becoming unavailable for the plant. About 50 weight % of nitrogen can sometimes be lost as a result of the volatilization of ammonia, all depending on the soil type, water content, pH, climate conditions, etc.

The availability of nitrogen, originating from urea, to the root system of plants can be improved by combining (i.e. by incorporation or addition) a urease inhibitor with a urea-containing fertilizer. Urease inhibitors are compounds that are capable of temporarily reducing the activity of the enzyme and slow down the rate at which urea is hydrolysed. There are many compounds that can inhibit urease, but only a few that are non-toxic, effective at low concentrations, chemically stable enough and able to be combined with urea-containing fertilizers.

Among the most effective urease inhibitors known today are the phosphoric triamide compounds, first disclosed in U.S. Pat. No. 4,530,714 (Allied Corporation, 1985).

An example of an effective urease inhibitor, disclosed in said patent is N-(n-butyl) thiophosphoric triamide, which will be referred to herein as nBTPT. This compound is actually the precursor for the active compound N-(n-butyl) phosphoric triamide (nBPT), obtained through oxidation of the thio-compound, but it is the thio-compound that is commonly produced, sold and used. Throughout this application, when referring to urease inhibitors of the type phosphoric triamide, it is understood that this comprises all active compounds, active precursors and active conversion products, resulting from said phosphoric triamides.

When combined with a urea-containing fertilizer, phosphoric triamide compounds reduce the rate at which urea is hydrolysed to ammonia in the soil. The benefits that are realized as a result of the delayed urea hydrolysis include the following: (1) nutrient nitrogen is available to the plant over a longer period of time, (2) excessive build-up of ammonia in the soil following the application of the urea-containing fertilizer is avoided, (3) the potential for nitrogen loss through ammonia volatilization is reduced, (4) the potential for damage by high levels of ammonia to seedlings and young plants is reduced, (5) plant uptake of nitrogen is increased, and (6) an increase in crop yields is attained. While phosphoric triamide compounds do not directly influence the rate of ammonium nitrification, they do control the levels of ammonium which are subject to the nitrification process and thereby indirectly controls the levels of nitrate nitrogen in the soil.

Surprisingly, the inventors have now been confronted with the problem that the urease inhibitor of the type phosphoric triamide, especially when applied as a liquid, which is the most common commercially available form, is not stable when in contact with a particulate urea-based blend composition comprising a urea-based compound in particulate form and one or more components in particulate form, selected from the group of nitrates, phosphates, sulphates and chlorides, despite the fact that a urease inhibitor of the type phosphoric triamide is generally disclosed for use with urea-based fertilizers. Moreover, even a urease inhibitor of the type phosphoric triamide in an alkaline organic solvent, such as a mixture of propylene glycol and N-methylpyrrolidine, stabilised to allow for long storage time of the solution, is rapidly degraded once applied on a particulate urea-based blend composition. Furthermore, the urease inhibitor of the type phosphoric triamide, also applied as a solid, is not stable when in contact with a particulate urea-based blend composition comprising a urea-based compound in particulate form and one or more components in particulate form, selected from the group of nitrates, phosphates, sulphates and chlorides. The problem is most relevant for the storage of said particulate urea-based blend composition, where the urea-based compound in particulate form, one or more components in particulate form, selected from the group of nitrates, phosphates, sulphates and chlorides and the urease inhibitor of the type phosphoric triamide are in intimate contact with one another for a prolonged period of time.

This finding was most surprising, but stimulated the inventors to find a solution for the problem of stabilizing the urease inhibitor (i.e. reducing its degradation) in the presence of a urea-based compound in particulate form, one or more components in particulate form, selected from the group of nitrates, phosphates, sulphates and chlorides.

In this context, stability refers to the property of a chemical compound, in particular the urease inhibitor compound of resisting chemically degradation. An improved stability means a longer lifetime (or shelf life).

PRIOR ART

The problem of stabilizing a urease inhibitor (i.e. reducing its degradation), in particular nBTPT, in the presence of a particulate urea-based blend comprising a urea-based compound in particulate form, and one or more components in particulate form, selected from the group of nitrates, phosphates, sulphates and chlorides, is disclosed in WO2017/081183 (Yara International, 2017), which discloses the addition of one or more alkaline or alkaline-forming inorganic or organic compound, selected from the group of metal oxides, carbonates, hydroxides, acetates, and organic bases, and mixtures thereof, in particular selected from the group of calcium oxide, zinc oxide, magnesium oxide, calcium carbonate, and mixtures thereof. However, it was found that, notwithstanding their stabilizing effects, the addition of said compounds induced the production of ammonia by the reaction of the urea-based compounds with the alkaline compound, such as CaO. The release of ammonia was found to amount to 0.1 to 0.2 vol % during coating.

WO2017/168288 (BASF (China) Company Ltd., 2017) discloses the problem of stabilizing a urease inhibitor (i.e. reducing its degradation), in particular nBTPT, in the presence of a particulate urea-based blend comprising urea-based compound in particulate form, and a further phosphate fertilizer, and discloses the addition of a cation source, selected from the group of $Ca^{2+}$, $Mg^{2+}$, $Li^+$, $Fe^{2+}$, $Fe^{3+}$, $Al^{3+}$, $Ag^+$, $Cu^{2+}$, $Zn^{2+}$, $Hg^{2+}$, $Pb^{2+}$, and $Ba^{2+}$. In a preferred embodiment, the cation source is $MgSO_4$. It was shown that the stabilizing a urease inhibitor was only effective with concentrations of 1.25% or more of the cation source, in particular $MgSO_4$. These amounts were found too high for practical use as a fertilizer.

CN 106 588 372 A (ANHUI KANGMU INT FERTL-IZER CO LTD, April 2017) discloses a fertilizer composition comprising 1.2% of magnesium sulphate, 1.0% of calcium carbonate, 6.2% of ammonium nitrate, 10.3% of diammonium phosphate (DAP), 37% of carbamide (i.e. urea) and 0.82% of NBTPT. The problem of the degradation of the NBTPT is not mentioned.

CN 103 524 221 B (UNIV SOUTHWEST, June 2015) discloses a fertilizer composition comprising 22-25% of urea, 14-17% of mono-ammonium phosphate (MAP), 30-33% of potassium phosphate, 1-3% of calcium carbonate, 5-8% of magnesium sulphate and 0.05-0.08% of NBTPT. The problem of the degradation of the NBTPT is not mentioned.

CN 104 860 775 A (GUANGDE LIMIN IRRIGATION AND WATER CONSERVANCY SPECIALIZED COOPERATIVE, August 2015) discloses a solid fertilizer comprising 1% of urea, 1% of ammonium sulphate, 0.33% magnesium sulphate, about 2% diammonium phosphate (DAP) and 0.033% NBTPT. The problem of the degradation of the NBTPT is not mentioned.

CN 106 069 441 A (WANGJIANG NONGWANG AGRICULTURAL SPECIALIZED COOP, November 2016) discloses a solid fertilizer comprising 20% carbamide (i.e. urea), 3% ammonium sulphate, 0.4% magnesium sulphate, potassium chloride, diammonium phosphate, potassium sulphate and 0.04% NBTPT. The problem of the degradation of the NBTPT is not mentioned.

CN 103 896 673 B (INST APPLIED ECOLOGY CAS, January 2016) a solid fertilizer comprising 10% urea, 40% ammonium sulphate, 25% mono-ammonium phosphate, 0.5% magnesium sulphate and 0.5% NBTPT. The problem of the degradation of the NBTPT is not mentioned.

Therefore, one of the objects of this invention is the provision of a stabilizer that stabilizes a urease inhibitor of the type phosphoric triamide in the presence of the particulate blend as defined in this application, yet does not generate ammonia, in particular by reaction with the components of the particulate blend, in particular less than 0.1 vol %.

Furthermore, one of the objects of this invention is the provision of a stabilizer which is effective at concentrations below 1 weight % (relative to the weight of the total composition).

STATEMENT AND SUMMARY OF THE INVENTION

Surprisingly, the inventors now found that the stability of the urease inhibitor of the type phosphoric triamide in the presence of a particulate urea-based blend composition comprising a urea-based compound in particulate form and one or more components in particulate form, selected from the group of nitrates, phosphates, sulphates and chlorides, can be greatly improved when a stabilizer is applied to said particulate urea-based blend composition, the stabilizer comprising magnesium sulphate in combination with an alkaline or alkaline-forming compound, selected from the group of calcium oxide, zinc oxide, magnesium oxide, calcium carbonate, and mixtures thereof.

In its broadest concept, the invention is concerned with particulate urea-based blend composition comprising a urea-based compound in particulate form and one or more components in particulate form, selected from the group of nitrates, phosphates, sulphates and chlorides, and a urease inhibitor of the type phosphoric triamide, and a magnesium sulphate, wherein the urea-based blend composition is further characterized in that it comprises an alkaline or alkaline-forming compound, selected from the group of calcium oxide, zinc oxide, magnesium oxide, calcium carbonate, and mixtures thereof.

By applying a stabilizer comprising magnesium sulphate and an alkaline or alkaline-forming compound, selected from the group of calcium oxide, zinc oxide, magnesium oxide, calcium carbonate, and mixtures thereof (i.e. the stabilizer according to the invention) to a urea-based blend composition comprising a urea-based compound in particulate form and one or more components in particulate form, selected from the group of nitrates, phosphates, sulphates and chlorides, and a urease inhibitor of the type phosphoric triamide, the stability of the urease inhibitor of the type phosphoric triamide is greatly improved, leading, among others, to lower ammonia emissions, even when the urease inhibitor of the type phosphoric triamide was added to said urea-based blend composition a long time before the actual application on the field as a fertilizer. Furthermore, it was found that the stabilizer according to the invention stabilizes a urease inhibitor of the type phosphoric triamide in the presence of said urea-based blend composition material, and does not generate a substantial amount of ammonia, in particular by reaction with the urea-based compound material or the one or more components in particulate form, selected from the group of nitrates, phosphates, sulphates and chlorides.

By the integration of the stabilizer according to the invention into the urea-based blend composition comprising the urea-based compound, the one or more components in particulate form, selected from the group of nitrates, phosphates, sulphates and chlorides, and a urease inhibitor of the type phosphoric triamide, the stability of the urease inhibitor of the type phosphoric triamide is greatly improved, especially during storage, such that lower amounts of said urease inhibitor may be used.

In particular is claimed a particulate urea-based blend composition comprising a urea-based compound in particulate form, one or more components in particulate form, selected from the group of nitrates, phosphates, sulphates and chlorides, a urease inhibitor of the type phosphoric triamide, magnesium sulphate and an alkaline or alkaline-forming compound, selected from the group of calcium oxide, zinc oxide, magnesium oxide, calcium carbonate, and mixtures thereof, wherein the composition contains:
- 40 to 99 weight % of the urea-based compound in particulate form;
- 1 to 60 weight % of the one or more components in particulate form, selected from the group of nitrates, phosphates, sulphates and chlorides;
- 0.0001 to 1 weight % of the urease inhibitor of the type phosphoric triamide;
- 0.02 to 1 weight % of the magnesium sulphate; and
- an amount of the alkaline or alkaline-forming compound, selected from the group of calcium oxide, zinc oxide, magnesium oxide, calcium carbonate, and mixtures thereof, such that the weight ratio of said alkaline or alkaline-forming compound to magnesium sulphate ranges from 1:20 to 1:2;

adding up to 100 weight %, being the total weight of the composition.

According to a particular embodiment of the present invention, the magnesium sulphate is present in the composition at a level of 0.05 to 1 weight %, relative to the total weight of the composition.

According to a particular embodiment of the present invention, the magnesium sulphate is selected from the group of anhydrous, mono-, di-, tri-, tetra-, penta-, hexa-, heptahydrate, and mixtures thereof.

According to a particular embodiment of the present invention, the magnesium sulphate has a purity of >70%, preferably >80%, more preferably >90%, most preferably >99%.

According to a particular embodiment of the present invention, the urease inhibitor of the type phosphoric triamide is a compound of formula I:

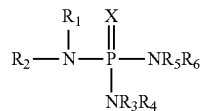

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl; or $R_1$ and $R_2$ together may form an alkylene or alkenylene chain which may optionally include one or more heteroatoms of divalent oxygen, nitrogen or sulphur completing a 4, 5, 6, 7, or 8 membered ring system;
$R_3$, $R_4$, $R_5$ and $R_6$ are individually hydrogen or alkyl having 1 to 6 carbon atoms, and
alkyl, cycloalkenyl, aralkyl, aryl, alkenyl, alkynyl, and cycloalkyl refer to compounds having from 1 to 10 carbon atoms, preferably from 1 to 6 carbon atoms.

According to a particular embodiment of the present invention, the urease inhibitor the urease inhibitor is N-(n-butyl) thiophosphoric triamide (nBTPT).

According to a particular embodiment of the present invention, the urease inhibitor, in particular N-(n-butyl) thiophosphoric triamide (nBTPT) is present in the urea-based blend composition at a level of 0.0001 to 1 weight %, preferably 0.02 to 0.2% weight %, most preferably 0.03 to 0.06 weight %, relative to the total weight of the urea-based blend composition.

According to a particular embodiment of the present invention, the weight ratio of urease inhibitor of the type phosphoric triamide to magnesium sulphate ranges from 1:20 to 1:1, preferably from 1:15 to 1:1, more preferably from 1:10 to 1:1.

According to a particular embodiment of the present invention, the urease inhibitor of the type phosphoric triamide is present onto the particles of the urea-based blend composition in liquid or in particulate form, is present as a melt-mixed component within the particles of the urea-based blend composition, or a combination thereof.

According to a particular embodiment of the present invention, the alkaline or alkaline-forming compound is magnesium oxide.

According to a particular embodiment of the present invention, the weight ratio of alkaline or alkaline-forming compound to magnesium sulphate ranges from 1:15 to 1:2, more preferably from 1:10 to 1:2.

According to a particular embodiment of the present invention, the amount of alkaline or alkaline-forming compound can be as low as 0.001 weight % (when the ratio is 1:20 on 0.02 weight % of magnesium sulphate) and as high as 0.5 weight % (when the ratio is 1:2 on 1 weight % of magnesium sulphate), and may have all values in between, depending on the amount of magnesium sulphate, relative to the total weight of the urea-based blend composition.

According to a particular embodiment of the present invention, the urea-based blend composition further comprises anti-caking and/or moisture-repellent and/or anti-dust material, preferably present as a coating to the urea-based blend material.

According to a particular embodiment of the present invention, the anticaking and/or moisture-repellent and/or anti-dust coating comprising at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

According to a particular embodiment of the present invention, the urea-based compound is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), or mixtures thereof.

According to a particular embodiment of the present invention, the one or more components in particulate form, selected from the group of nitrates, phosphates, sulphates and chlorides are selected from the group of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate (TSP), rock phosphate, potassium sulphate, potassium magnesium sulphate, ammonium sulphate (AS), potassium chloride (MOP), or mixtures thereof.

According to a particular embodiment of the present invention, the average particle size (dp50) of the particulate components is between 1 mm and 5 cm, as determined by mesh sieve screening.

According to a particular embodiment of the present invention, the urea-based blend composition contains:
- 40 to 99 weight % of a urea-based compound in particulate form;
- 1 to 60 weight % of one or more components in particulate form, selected from the group of nitrates, phosphates, sulphates and chlorides;
- 0.03 to 0.06 weight % of nBTPT;
- 0.05 to 0.1 weight % of a magnesium sulphate; and
- 0.015 to 0.03 weight % of magnesium oxide,
- adding up to 100 weight %, being the total weight of the composition.

According to a particular embodiment of the present invention, the urea-based blend composition comprises urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, potassium chloride (MOP), and a magnesium sulphate.

According to a particular embodiment of the present invention, the urea-based blend composition comprises urea in particulate form either coated or melt-mixed with a urease inhibitor of the type phosphoric triamide, in particular N-(n-butyl) thiophosphoric triamide (nBTPT), ammonium sulphate (AS) in particulate form, a magnesium sulphate.

The present invention further provides for the use of the particulate urea-based blend composition according to different embodiments of the present invention as a fertilizer, in particular for supporting the growth of agricultural products on a sulphur—deficient soil, a phosphor—deficient soil and/or a potassium—deficient soil.

The present invention further provides for the use of the particulate urea-based blend composition according to different embodiments of the present invention as an animal feed.

The present invention further provides for a method for the manufacture of a particulate urea-based blend composition according to the present invention, the method comprising the steps of:
1) providing 40 to 99 weight % of the urea-based compound in particulate form;
2) providing 1 to 60 weight % of the one or more components in particulate form, selected from the group of nitrates, phosphates, sulphates and chlorides;
3) providing 0.02 to 1 weight %, relative to the total weight of the composition, of a magnesium sulphate;
4) providing 0.0001 to 1 weight %, relative to the total weight of the composition, of a urease inhibitor of the type phosphoric triamide, preferably N-(n-butyl) thiophosphoric triamide (nBTPT);
5) providing an amount of the alkaline or alkaline-forming compound, selected from the group of calcium oxide, zinc oxide, magnesium oxide, calcium carbonate, and mixtures thereof, such that the weight ratio of said alkaline or alkaline-forming compound to magnesium sulphate ranges from 1:20 to 1:2;
6) optionally, providing coating material wherein the coating material is able to increase at least the anticaking and/or moisture repellence and/or anti-dust properties of said urea-based blend composition; and
7) mixing the components provided in steps 1), 2), 3), 4), 5) and 6) in any order.

The present invention further provides for a kit of parts, comprising an amount of:
a) a urease inhibitor of the type phosphoric triamide, preferably N-(n-butyl) thiophosphoric triamide (nBTPT);
b) a magnesium sulphate, such that the weight ratio of urease inhibitor of the type phosphoric triamide to magnesium sulphate ranges from 1:20 to 1:1, preferably from 1:15 to 1:1, more preferably from 1:10 to 1:1;
c) an alkaline or alkaline-forming compound, selected from the group of calcium oxide, zinc oxide, magnesium oxide, calcium carbonate, and mixtures thereof, preferably magnesium oxide, such that the weight ratio of said alkaline or alkaline-forming compound to magnesium sulphate ranges from 1:20 to 1:2, preferably from 1:15 to 1:2, more preferably from 1:10 to 1:2; and
d) optionally, one or more anti-caking and/or moisture-repellent and/or anti-dust compounds.

The present invention further provides for a method for improving the stability of a urease inhibitor of the type phosphoric triamide, in particular N-(n-butyl) thiophosphoric triamide, (nBTPT) in a particulate urea-based blend composition comprising a urea-based compound in particulate form, one or more components in particulate form, selected from the group of nitrates, phosphates, sulphates and chlorides and said urease inhibitor by the addition to said composition a stabilizer comprising from 0.02 to 1 weight % of a magnesium sulphate, relative to the total weight of the composition, and an amount of alkaline or alkaline-forming compound, selected from the group of calcium oxide, zinc oxide, magnesium oxide, calcium carbonate, and mixtures thereof, such that the weight ratio of said alkaline or alkaline-forming compound to magnesium sulphate ranges from 1:20 to 1:2.

The invention will now be described in more detail.

DETAILED DESCRIPTION OF THE INVENTION

Within the context of this application, with a particulate form is meant a solid physical form that can also be designated as granulated, prilled, crystalline, compacted, powdered, and the like, wherein the respective compound is in a small unit form. Preferably, the urea-based component is a granule or prill, the one or more components in particulate form, selected from the group of nitrates, phosphates, sulphates and chlorides are a granule or prill, the magnesium sulphate is a powder, the urease inhibitor is a powder and the alkaline or alkaline-forming compound, selected from the group of calcium oxide, zinc oxide, magnesium oxide, calcium carbonate is a powder.

Magnesium Sulphate

According to a particular embodiment of the present invention, the invention is concerned with a particulate urea-based blend composition comprising a urea-based compound in particulate form, one or more components in particulate form, selected from the group of nitrates, phosphates, sulphates and chlorides, a urease inhibitor of the type phosphoric triamide, magnesium sulphate and an alkaline or alkaline-forming compound, selected from the group of calcium oxide, zinc oxide, magnesium oxide, calcium carbonate, and mixtures thereof.

According to a particular embodiment of the present invention, the magnesium sulphate is present in the composition at a level of 0.02 to 1 weight %, most preferably 0.05 to 1 weight %, relative to the total weight of the composition. From experiments, it was observed that more than 1 weight % did not produce a proportionally better stabilizing effect.

Magnesium sulphate is an inorganic salt with the chemical formula $MgSO_{4.x}(H_2O)$ where $0 \leq x \leq 7$. It is solid at room temperature and is available in powder form with various average particle sizes ($d_{50}$), such as between 5 and 1000 μm. A variety of hydrates is known. The heptahydrate $MgSO_4.7(H_2O)$ (epsomite) can be prepared by neutralizing sulfuric acid with magnesium carbonate or oxide, but it is usually obtained directly from natural sources. The heptahydrate readily loses one equivalent of water to form the hexahydrate. The monohydrate, $MgSO_4.H_2O$ is found as the mineral kieserite. It can be prepared by heating the hexahydrate to approximately 150° C. Further heating to approximately 200° C. gives anhydrous magnesium sulphate.

According to a particular embodiment of the present invention, the magnesium sulphate is selected from the group of anhydrous, mono-, di-, tri-, tetra-, penta-, hexa-, heptahydrate, and mixtures thereof. Preferably, the magnesium sulphate is anhydrous magnesium sulphate. It was found that presence of water molecules had some negative influence on the quality of hygroscopic components in the blend, if present.

According to a particular embodiment of the present invention, the magnesium sulphate has a purity of >70%, preferably >80%, more preferably >90%, most preferably >99%.

The magnesium sulphate may be applied to the composition of the present invention by common application techniques, such as coating and blending techniques, well known to the skilled person, such as spray-coating and drum-coating. It is preferred that the magnesium sulphate and the urease inhibitor of the type phosphoric triamide is in intimate contact with each other, in order for the magnesium sulphate to be effective. This can be achieved, most preferably, through the application of the urease inhibitor of the type phosphoric triamide, the magnesium sulphate, and optionally the anticaking and/or moisture-repellent coating to the particulate components, either successively, or simultaneously, for example as a liquid anticaking and/or moisture-repellent coating composition comprising the urease inhibitor of the type phosphoric triamide and the magnesium sulphate.

Urease Inhibitor

According to a particular embodiment of the present invention, the invention is concerned with a particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT), wherein the urease inhibitor of the type phosphoric triamide is a compound of formula I:

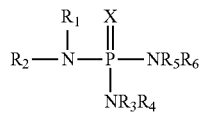

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms. In the present specification and claims, the term "phosphoric triamide compounds" is used to refer to the compounds of formula I.

The terms alkyl, cycloalkenyl, aralkyl, aryl, alkenyl, alkynyl, and cycloalkyl as used herein, refer to compounds having from 1 to 10 carbon atoms, preferably from 1 to 6 carbon atoms. The lowest number of carbon atoms is between 1 to 3 depending on the structure of the substituent.

nBTPT is sold in the market, in different formulations and has the following chemical formula II

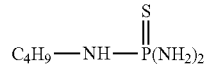

Formula II

It should be understood that the term nBTPT, as used throughout this specification, refers not only to N-(n-butyl) thiophosphoric triamide in its pure form, but also to industrial grades of this compound which may contain up to 50 weight % impurities, depending on the method of synthesis and purification scheme(s), if any, employed in the production of the nBTPT.

In order to be effective, the urease inhibitor of the type phosphoric triamide, in particular N-(n-butyl) thiophosphoric triamide (nBTPT) is present in the urea-based blend composition at a level of 0.0001 to 1 weight %, preferable 0.02 to 0.2 weight %, most preferably 0.03 to 0.06 weight %, relative to the total weight of the urea-based blend composition.

As generally referred to herein and unless indicated otherwise, weight % refers to the weight percentage of an ingredient of a composition, relative to the total weight of said composition.

According to one embodiment, the weight ratio of urease inhibitor of the type phosphoric triamide to magnesium sulphate ranges from 1:20 to 1:1, preferably from 1:15 to 1:1, more preferably from 1:10 to 1:1. An exemplary weight ratio is 1:10.

According to one embodiment, the urease inhibitor can be a liquid at room temperature, a liquid at elevated temperature, or a solid which is dissolved (solution) or suspended (suspension) into a liquid carrier, all of which are different liquid forms of the urease inhibitor of the type phosphoric triamide, in particular N-(n-butyl) thiophosphoric triamide (nBTPT).

In embodiments where the urease inhibitor of the type phosphoric triamide, in particular N-(n-butyl) thiophosphoric triamide (nBTPT), is used as a liquid, it is preferably used as a 0.1 to 75 weight % solution, preferably as a 15 to 30 weight % solution, relative to the total weight of the solution. Commercial solutions are available, for example as Agrotain® Ultra (Koch, US), N Yield™ (Eco Agro, US), Rhodia Ag-Rho™ N Protect B (Solvay, Germany), Iper N-Protect Liquid (Van Iperen, The Netherlands) and BASF Limus (BASF, Germany).

In embodiments where the urease inhibitor nBTPT is used as a liquid, dissolved into a carrier, it can be used as a powder, dissolved in propylene glycol, for example as 17.5 weight % of nBTPT. It is available from Yara International ASA (Norway) as Amiplus® liquid.

Experiments showed that, in compositions according to the invention, less urease inhibitor of the type phosphoric triamide, in particular N-(n-butyl) thiophosphoric triamide (nBTPT) needs to be used than is commonly employed in the prior art. For example, according to the invention, an amount of 0.05 weight % is mostly preferred, while for the use of Agrotain® Ultra, an amount of 0.09 weight % is recommended. This finding can at least partly be attributed to the fact that in the compositions according to the invention, the urease inhibitor of the type phosphoric triamide, in particular N-(n-butyl) thiophosphoric triamide (nBTPT) is stabilized, while in the prior art, an overdose is needed to compensate for the degradation of the urease inhibitor and to increase shelf-live thereof. This finding also ensures that less urease inhibitor of the type phosphoric triamide, in particular N-(n-butyl) thiophosphoric triamide (nBTPT) is introduced into the environment.

In embodiments where the urease inhibitor is used in its solid form, it is used as a powder, preferably with a purity of 99 weight % or more. It is available, for example, from Sunfit Chemical Co. (China).

According to one embodiment, a urea-based blend composition is claimed wherein the urease inhibitor of the type phosphoric triamide is present onto the particles of the urea-based blend composition in liquid or in particulate form, is present as a melt-mixed component within the particles of the urea-based blend composition, or a combination thereof.

According to one embodiment, the urease inhibitor of the type phosphoric triamide, in particular N-(n-butyl) thiophosphoric triamide (nBTPT) can be applied to the composition comprising the particulate components, in particular the urea-based compound, by common coating and blending techniques, well known to the skilled person, such as spray-coating and drum-coating.

According to another embodiment, the urease inhibitor of the type phosphoric triamide, in particular N-(n-butyl) thiophosphoric triamide (nBTPT) is melt-mixed with the urea-based compounds, in the sense that the urease inhibitor of the type phosphoric triamide, in particular N-(n-butyl) thiophosphoric triamide (nBTPT) is mixed in a urea melt, either as solid or as liquid, after which the melt is processed into solid particles.

According to yet another embodiment, a combination of application onto the urea-based compound in liquid or in particulate form and melt-mixing can be used.

Within the context of this invention, melt-mixed refers to a state where the urease inhibitor of the type phosphoric triamide, in particular N-(n-butyl) thiophosphoric triamide (nBTPT) is mainly present inside the solid particle, typically adding during the forming process of the solid particle.

It is preferred that the urease inhibitor of the type phosphoric triamide, in particular N-(n-butyl) thiophosphoric triamide (nBTPT), is in intimate contact with the urea-based compound for the urease inhibitor to be most effective in terms of urease inhibition. However, embodiments may be foreseen wherein the urease inhibitor is present as a coating to one or more other particulate components of the blend, such as the stabilizer or the one or more components in particulate form, selected from the group of nitrates, phosphates, sulphates and chlorides.

Alkaline or Alkaline-Forming Compounds (Co-Stabilizer)

According to the invention, the urea-based blend composition further comprises an alkaline or alkaline-forming compound, selected from the group of calcium oxide, zinc oxide, magnesium oxide, calcium carbonate, and mixtures thereof.

Surprisingly, it was found that the addition of an amount of one or more of the abovementioned compounds increases the stability properties of magnesium sulphate to stabilize a urease inhibitor of the type phosphoric triamide in the presence of the urea-based blend material, without generating substantial amounts of ammonia, in particular by reaction with the urea-based blend material.

According to one embodiment, the weight ratio of said alkaline or alkaline-forming compound to magnesium sulphate ranges from 1:15 to 1:2, more preferably from 1:10 to 1:2. Exemplary weight ratios are about 1:10 and about 1:3, i.e. the amount of alkaline or alkaline-forming compound is always smaller than the amount of magnesium sulphate. According to one embodiment, the amount of alkaline or alkaline-forming compound is 2, 3, 5 or even 10 times smaller than the amount of magnesium sulphate. Preferably, the amount of alkaline or alkaline-forming compound to magnesium sulphate may range from 0.001 to 0.5 weight %.

It is noted that, in comparison to WO2017/168288, the co-stabilizer compounds to not provide cations as they are not a salt, or, within the definition in WO2017/168288 do not have a solubility of at least 33 g/L in water at a temperature of from 15° C. to 25° C., wherein the solubility is measured in deionized or distilled water. According to WO2017/168288, a certain solubility of the salt is advantageous in view of the fact that the salt can easily dissolve, and the cations thus be released from the crystal lattice.

Coating

According a particular embodiment of the present invention, the urea-based blend composition according to the invention further comprises anti-caking and/or moisture-repellent and/or anti-dust material, applied onto the particulate components of the urea-based blend composition as a coating, wherein the coating comprises at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

Examples of suitable anticaking and/or moisture-repellent coatings are vegetable oil (e.g. rapeseed or neem), paraffin and Novoflow anti-caking and/or moisture repellence agents (Novochem Fertilizer Additives, The Netherlands).

Preferably, the moisture-repellent coating is a coating such as disclosed in EP 0768993 A1 (Norsk Hydro ASA) for a nitrogen-containing fertilizer, comprising at least a wax, an oil and a resin which is oil-soluble and miscible with wax.

Urea-Based Compound

The urea-based compound may be selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK) such as salts derived from mixtures of urea with MPO and/or SOP, or mixtures thereof, and is preferably urea.

The urea-based compound may be a granulated or prilled material that is commonly and widespread available. It may contain elemental sulphur, be coated with micronutrients or other nutrients, or be treated in any other way.

The particulate urea-based blend composition may comprise from about 40 to 99 weight % of a urea-based compound in particulate form.

Preferably, to serve as a fertilizer, the average particle size (dp50) of the urea-based compound in particulate form is between 1.0 mm and 5 cm, preferably between 1.0 mm and 1 cm, preferably between 1.0 and 6.0 mm, preferably between 2.0 and 4.0 mm, preferably between 3.0 and 5.0 mm, preferably between 2.5 and 3.6 mm, as determined by mesh sieve screening.

The definition of the urea-based compound, as disclosed herein, does not comprise its use as a coating material. Such coating material has a smaller particle size (dp50), usually between 0.1 and 100 µm.

Nitrate, Phosphate, Sulphate and/or Chloride Component

The one or more components in particulate form, selected from the group of nitrates, phosphates, sulphates and chlorides may be at least one of the following compounds: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate (TSP), rock phosphate, potassium sulphate, potassium magnesium sulphate, ammonium sulphate (AS), potassium chloride (MOP), or mixtures thereof.

The component may be a granulated or prilled material that is commonly and widespread available. It may contain elemental sulphur, be coated with micronutrients or other nutrients, or be treated in any other way.

The urea-based blend composition may comprise from about 1 to 60 weight %, relative to the total weight of the composition, of one or more components in particulate form, selected from the group of nitrates, phosphates, sulphates and chlorides.

Preferably, to serve as a fertilizer, the average particle size (dp50) of the one or more components in particulate form, selected from the group of nitrates, phosphates, sulphates and chlorides is between 1.0 mm and 5 cm, preferably between 1.0 mm and 1 cm, preferably between 1.0 and 6.0 mm, preferably between 2.0 and 4.0 mm, preferably between 3.0 and 5.0 mm most preferably between 2.5 and 3.6 mm, as determined by mesh sieve screening.

The definition of the one of more components, as disclosed herein, does not comprise its use as a coating material. Such coating material has a smaller particle size (dp50), usually between 0.1 and 100 µm.

Blends

Preferably, the particulate urea-based blend composition according to the invention is a homogeneous blend composition, wherein all particles of the blend are randomly in intimate contact with each other.

According to one aspect of the invention, the particulate urea-based blend composition according to the present invention comprises:
- 40 to 99 weight % of a urea-based compound in particulate form;
- 1 to 60 weight % of one or more components in particulate form, selected from the group of nitrates, phosphates, sulphates and chlorides;
- 0.03 to 0.06 weight % of nBTPT;
- 0.05 to 0.1 weight % of a magnesium sulphate;
- 0.015 to 0.03 weight % of magnesium oxide, adding up to 100 weight %, being the total weight of the composition.

It is to be understood that, in the whole of this application, the total weight of 100 weight % is a rounded number, and that a total weight % of 99.51 or 100.49 is still to be regarded as 100 weight %. Therefore, any weight % cited is to be regarded as about that cited value. In particular, a range of 1 to 60 weight % is to be regarded as about 1 to about 60 weight %, and a range of 40 to 99 weight % is to be regarded as about 40 to about 99 weight %.

In particular, the invention relates to a particulate urea-based blend composition comprising urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, potassium chloride (MOP), and magnesium sulphate (as the stabilizer).

In particular, the invention relates to a particulate urea-based blend composition comprising urea in particulate form either coated or melt-mixed with a urease inhibitor of the type phosphoric triamide, in particular N-(n-butyl) thiophosphoric triamide (nBTPT), ammonium sulphate (AS) in particulate form, and magnesium sulphate (as the stabilizer).

In particular, the invention relates to a particulate urea-based blend composition comprising urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, and magnesium sulphate (as the stabilizer).

In particular, the invention relates to a particulate urea-based blend composition comprising urea in particulate form either coated or melt-mixed with a urease inhibitor of the type phosphoric triamide, in particular N-(n-butyl) thiophosphoric triamide (nBTPT), potassium chloride (KCl) in particulate form, and magnesium sulphate (as the stabilizer).

Use

The particulate urea-based blend composition according to the invention is in particular suitable as a fertilizer, in particular for supporting the growth of agricultural products on a sulphur—deficient soil, for supporting the growth of agricultural products on a phosphor—deficient soil, for supporting the growth of agricultural products on a potassium—deficient soil and as an animal feed.

Manufacturing

According a particular embodiment of the present invention, the invention further relates to a method for the manufacture of a particulate urea-based blend composition comprising a urea-based compound in particulate form, one or more components in particulate form, selected from the group of nitrates, phosphates, sulphates and chlorides, and a urease inhibitor of the type phosphoric triamide, in particular N-(n-butyl) thiophosphoric triamide (nBTPT).

In particular, the invention relates to a method for the manufacture of a particulate urea-based blend composition according to the invention, the method comprising the steps of:

1) providing a urea-based compound in particulate form;
2) providing one or more components in particulate form, selected from the group of nitrates, phosphates, sulphates and chlorides;
3) providing 0.0001 to 5 weight %, relative to the total weight of the composition, of a magnesium sulphate;
4) providing 0.0001 to 1 weight %, relative to the total weight of the composition, of a urease inhibitor of the type phosphoric triamide, preferably N-(n-butyl) thiophosphoric triamide (nBTPT);
5) providing an amount of the alkaline or alkaline-forming compound, selected from the group of calcium oxide, zinc oxide, magnesium oxide, calcium carbonate, and mixtures thereof, such that the weight ratio of said alkaline or alkaline-forming compound to magnesium sulphate ranges from 1:20 to 1:2;
6) optionally, providing coating material wherein the coating material is able to increase at least the anticaking and/or moisture repellence and/or anti-dust properties of said urea-based blend composition; and
7) mixing the components provided in steps 1), 2), 3), 4), 5) and 6) in any order.

It was found that the order of addition of the components of the composition according to the invention, i.e. a urea-based compound, one or more components in particulate form, selected from the group of nitrates, phosphates, sulphates and chlorides, magnesium sulphate, a urease inhibitor of the type phosphoric triamide, a stabilizer, a co-stabilizer and the coating material was had little effect on the performance of the claimed effects. For example, it is equally possible to first apply the urease inhibitor, stabilizer, co-stabilizer and coating material to the urea-based compound and subsequently physically blend this mixture with the one or more components in particulate form, selected from the group of nitrates, phosphates, sulphates and chlorides, as well as first physically blend the urea-based compound with the one or more components in particulate form, selected from the group of nitrates, phosphates, sulphates and chlorides, and subsequently mix said blend with the urease inhibitor, stabilizer, co-stabilizer and coating material.

Kit-of-Parts

According a particular embodiment of the present invention, the invention further relates to a kit of parts, comprising an amount of:

a) a urease inhibitor of the type phosphoric triamide, preferably N-(n-butyl) thiophosphoric triamide (nBTPT);
b) a magnesium sulphate, such that the weight ratio of urease inhibitor of the type phosphoric triamide to magnesium sulphate ranges from 1:20 to 1:1, preferably from 1:15 to 1:1, more preferably from 1:10 to 1:1;
c) an alkaline or alkaline-forming compound, selected from the group of calcium oxide, zinc oxide, magnesium oxide, calcium carbonate, and mixtures thereof, preferably magnesium oxide, such that the weight ratio of said alkaline or alkaline-forming compound to magnesium sulphate ranges from 1:20 to 1:2; and d) optionally, one or more anti-caking and/or moisture-repellent and/or anti-dust compounds.

Such kit of parts can then be added to the urea-based blend composition, in particular to the particulate urea-based compound to the one or more components in particulate form, selected from the group of nitrates, phosphates, sulphates and chlorides, to obtain the particulate urea-based blend composition comprising a urea-based compound in particulate form, one or more components in particulate form, selected from the group of nitrates, phosphates, sulphates and chlorides, the stabilizer and a urease inhibitor of the type phosphoric triamide according to the invention.

According to one embodiment, the components are provided in separate units. According to another embodiment, the components are premixed and provided in a combined unit. Preferably, they are premixed in a given weight ratio of urease inhibitor of the type phosphoric triamide to magnesium sulphate to of 1:20 to 1:1, preferably 1:15 to 1:1, more preferably 1:10 to 1:1.

Finally, the invention concerns a method for improving the stability of a urease inhibitor of the type phosphoric triamide, in particular N-(n-butyl) thiophosphoric triamide (nBTPT), in a urea-based blend composition comprising a urea-based compound in particulate form, one or more components in particulate form, selected from the group of nitrates, phosphates, sulphates and chlorides and said urease inhibitor by the addition to said composition of a stabilizer comprising from 0.02 to 1 weight % of a magnesium sulphate, relative to the total weight of the composition, and an amount of alkaline or alkaline-forming compound, selected from the group of calcium oxide, zinc oxide, magnesium oxide, calcium carbonate, and mixtures thereof, such that the weight ratio of said alkaline or alkaline-forming compound to magnesium sulphate ranges from 1:20 to 1:2.

Detailed embodiments have been discussed herein above and in the following examples.

The preferred embodiments of the method according to the invention will now be illustrated by means of the following non-limitative examples.

EXAMPLES

All examples shown were carried out with a YaraVera® Amidas product, which is a urea ammonium sulfate material. Such a material is equivalent to a physical blend of urea and ammonium sulfate.

Figure 4:
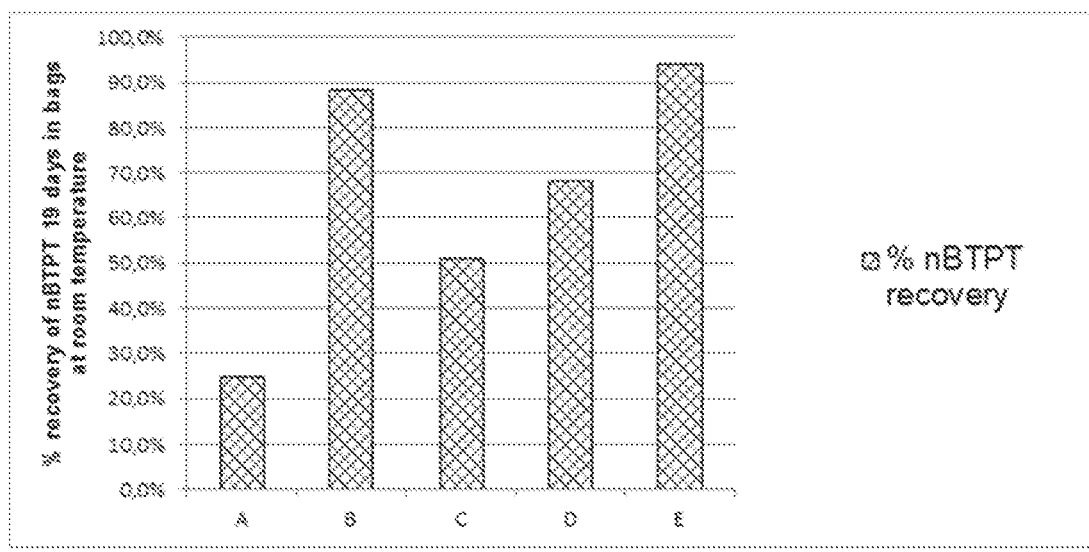

FIG. 4. Stability of nBTPT on a YaraVera® Amidas product comprising 462 ppm nBTPT using different MgSO$_4$/MgO combinations [A=no stabilizer; B=CaO (2310 ppm); C=MgO (212 ppm); D=MgSO$_4$>98% grade (4620 ppm); E=MgSO$_4$>98% grade (924 ppm)/MgO (212 ppm)]

EXPERIMENTAL

1. Volatilization Measurements (Ammonia Release 2 L Diffusion Kit)

200 g of UAS product, treated with nBTPT/stabilizer are put in a 2 L plastic container. Through the lid, a Draeger tube is placed for the measurement of vol % ammonia. The Draeger tube turns from yellow to bleu/purple when ammonia is absorbed by the tube. The amount of vol % ammonia released can be followed in time.

2. nBTPT Measurements

For lab scale experiments, 1.2 kg of solid fertilizer material was added to a lab scale drum. In a next step, the nBTPT/stabilizer material was slowly added. A residence time of 10 minutes was applied and the rotating speed of the drum was consequently the same in each experiment. In case a moisture-repellent coating was added, a nebulizer was used and depending on the order of addition, the moisture-repellent coating was added before or after addition of the nBTPT material. Before use, the moisture-repellent coating was preheated to 80° C. Larger scale experiments with amounts up to 40 kg of fertilizer material were performed in a concrete mixer.

The samples were stored under several conditions, dependent on the type of samples:

Bagged at room temperature (18-25° C.)
Bagged at 40° C.
Open to air at room temperature (18-25° C.)

3. HPLC Analysis of nBTPT-Content

HPLC analysis of nBTPT is done as described in the procedure CEN 15688-2007.

4. Products

UAS was obtained from Yara as granules YaraVera® Amidas 40-0-0 (product code PA421X).

Solid N-(n-butyl)thiophosphoric triamide was obtained from Sunfit Chemical Co. (China) (CAS-Nr. 94317-64-3), as a white crystalline solid with a melting point of 58-60° C.

MgO technical grade was obtained from Mannekus & Co B. V., Schiedam, The Netherlands (dp(50)=27 μm, +/−90% purity, 2-2.9% CaO, 1.1% SiO2).

CaO technical grade was obtained from VWR International, Oud-Heverlee, Belgium (91.3% pure, 2.7% CaCO$_3$ and 6% Ca(OH)$_2$), dp(50)=22 μm).

CaCO$_3$ (limestone powder) was obtained from Nordkalk AB, Finland (98.5% pure, dp(50)=7 μm).

CaSO$_4$ anhydrous was obtained from Alfa Aesar, Haverhill, USA.

MgSO$_4$ anhydrous, 99.999%, was obtained from Alfa Aesar, Haverhill, USA.

MgSO$_4$ anhydrous, >99.5%, was obtained from Alfa Aesar, Haverhill, USA. MgSO$_4$ anhydrous, >98%, was obtained from Ekmekciogullari, Turkey.

MgSO$_4$.7H$_2$O, >99.5%, was obtained from Merck KGaA, Darmstadt, Germany.

Coating: Moisture-repellent (MR) coating was made according to EP 0768993 A1 (Norsk Hydro ASA) by mixing about 28 weight % of wax, about 68 weight % of oil and about 4 weight % of a resin, applied in an amount of about 0.1-0.5 weight % to the fertilizer. It will be referred herein as NH-coating.

PRIOR ART EXPERIMENT

WO2017/168288 discloses several compositions comprising urea, a phosphate component and various amounts of MgSO$_4$. Prevention of the degradation of the urease inhibitor used (NBPT+NPPT)* is not effective with amounts of MgSO$_4$ smaller than 0.25 g (1.25 weight %).

| Example 3, Sample 2 & 3 | 0.04% of NBPT + NPPT, 10 g urea, 10 g Urea + 10 g TSP*/DAP | 0.5 g MgSO$_4$ (2.5 weight %) | effective prevention of ammonia release |
|---|---|---|---|
| Example 4, Sample 3 | 0.04% of NBPT + NPPT, 10 g urea, 10 g Urea + 10 g TSP/DAP | 0.25 g MgSO$_4$ (1.25 weight %) | effective prevention of ammonia release |
| Example 6 Samples 1, 2, 3, 4 & 5 | 0.04% of NBPT + NPPT, 10 g urea, 10 g urea + 10 g DAP | various amounts of MgSO$_4$ 0.5 g (2.5 weight %) 0.25 g (1.25 weight %) 0.18 g (0.9 weight %) 0.11 g (0.55 weight %) 0.05 g (0.25 weight %) | prevention of ammonia release is not effective with amounts smaller than 0.25 g (1.25 weight %) |

*TSP = triple super phosphate
*NBPT = N-(n-butyl)thiophosphoric acid triamide = nBTPT
*NPPT = N-(n-propyl)thiophosphoric acid triamide Experiment 1 (Ammonia Release)

Figure 1:
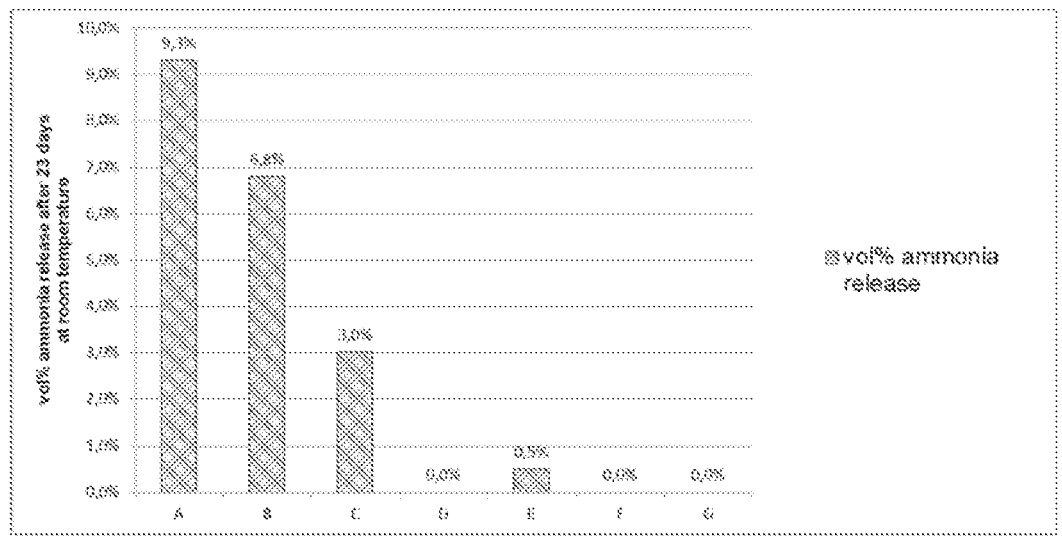
FIG. 1. Ammonia release of a YaraVera® Amidas product comprising 462 ppm nBTPT, treated with several stabilizers (see Table 1).

Experiment 1 defines the problem. FIG. 1 shows the ammonia release of a YaraVera® Amidas product comprising 462 ppm nBTPT, treated with several stabilizers. The numbers between brackets represent, for each stabilizer compound, the weight ratio of the said stabilizer compound compared to nBTPT.

TABLE 1

Ammonia release with different stabilizers

| Example | Stabilizer composition |
|---|---|
| A (prior art) | MgO (4.3) |
| B (prior art) | CaO-G-0554 (5.5) |
| C (prior art) | MgO (0.86) |
| D (prior art) | none |
| E (prior art) | CaCO$_3$ (9.98) |
| F (prior art) | CaSO$_4$ (12.1) |
| G | MgSO$_4$ (10.7) |

Although compounds such as MgO and CaO are mentioned in the prior art document WO2017042194 (Yara International, 2017) as most effective stabilizers for nBTPT in the presence of a urea ammonium sulphate material, these compounds are observed as producing ammonia in the presence of said material, which is an unwanted effect of these stabilizers. Only without stabilizer, and with MgSO$_4$ and with CaSO$_4$, there is no ammonia release.

Experiment 2

Figure 2A:
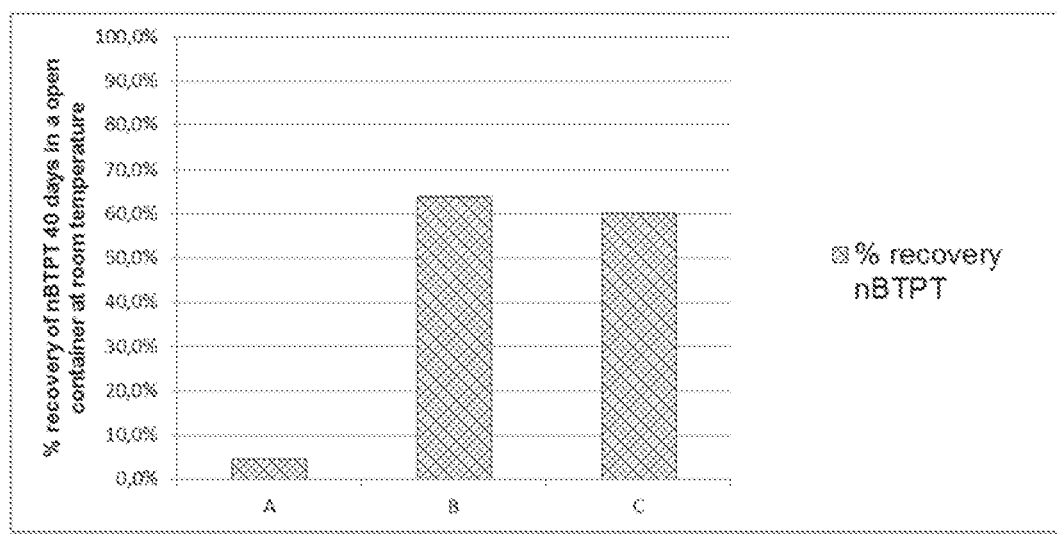
FIG. 2A. Stability of nBTPT on a YaraVera® Amidas product comprising 462 ppm nBTPT in plastic containers open to air at room temperature after 40 days [A=no stabilizer; B=CaO (2541 ppm); C=$MgSO_4$ 99.5% purity (4957 ppm)].
Figure 2B:
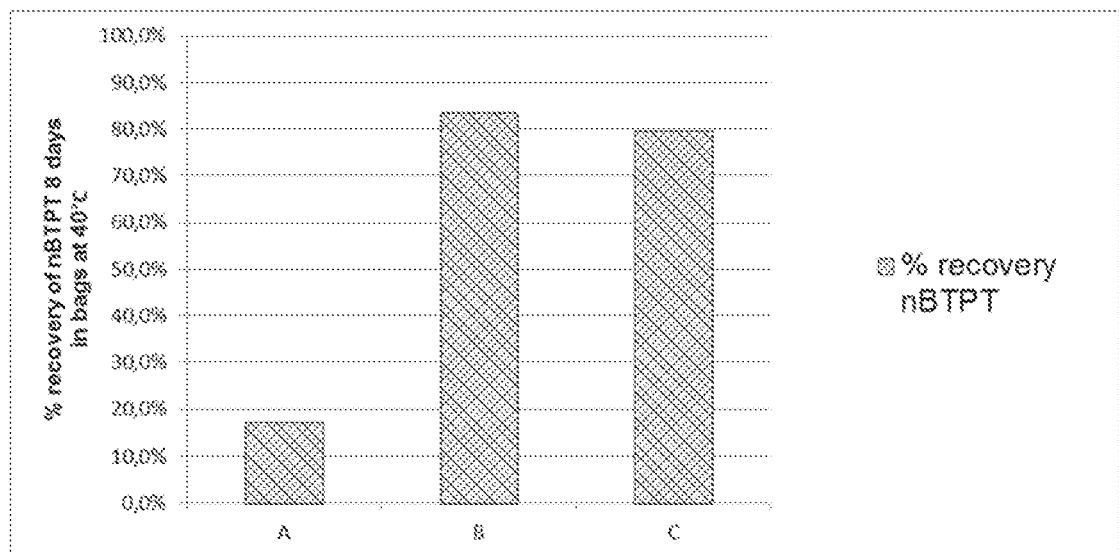
FIG. 2B. Stability of nBTPT on a YaraVera® Amidas product comprising 462 ppm nBTPT, in bags at 40° C. [A=no stabilizer; B=CaO (2541 ppm); C=$MgSO_4$ 99.5% purity (4957 ppm)] after 8 days.

This experiment was conducted to show the difference between the beneficial effect of the addition of an alkaline or alkaline-forming inorganic or organic compound (CaO—prior art) and MgSO$_4$ (VWR grade 99.5%) to UAS on the stability of nBTPT in the presence of UAS open to the air at room temperature (FIG. 2A) and in bags at elevated temperature (FIG. 2B). As can be seen, the stabilizing effect of $MgSO_4$ is comparable with the effect of the prior art compound (CaO), but no ammonia is generated (as shown in FIG. 1).

Experiment 3 (Different Grades)

Figure 3:
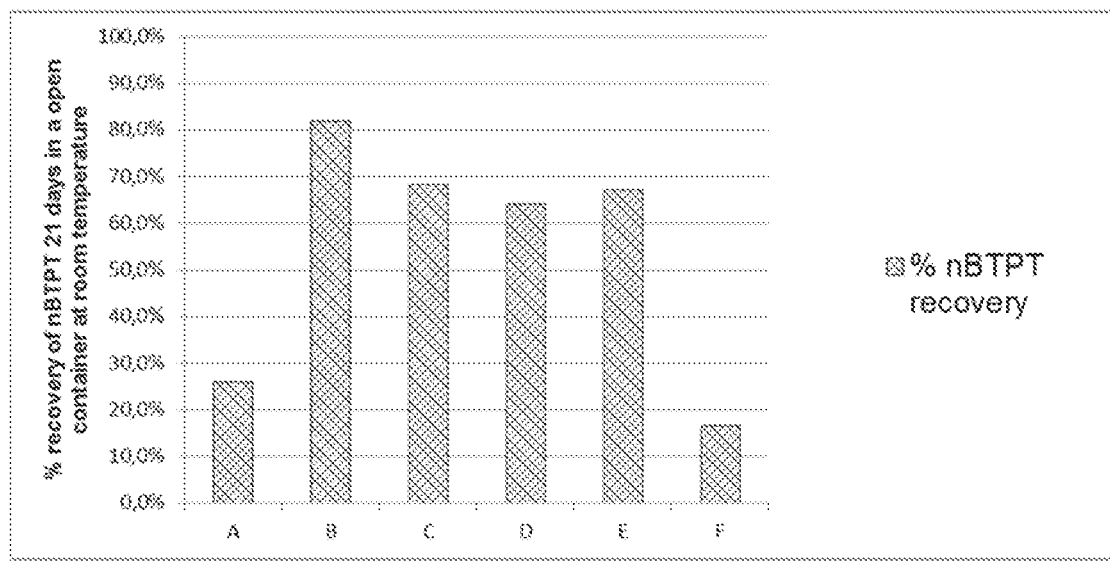
FIG. 3. Stability of nBTPT on a YaraVera® Amidas product comprising 462 ppm nBTPT using different grades and forms of $MgSO_4$ and $Na_2SO_4$, stored in open plastic containers at room temperature for 21 days. [A=no stabilizer; B=CaO (2541 ppm); C=$MgSO_4$ 99.5% purity (4957 ppm); D=MgSO$_4$ 99.999% purity (4957 ppm); E=MgSO$_4$.7H$_2$O (10163 ppm; F=Na$_2$SO$_4$ (5849 ppm]

This experiment shows the effect of the addition of different grades and forms of $MgSO_4$ and also another sulfate, $Na_2SO_4$, compared to the prior art compound CaO for open to air storage conditions at room temperature (FIG. 3). All $MgSO_4$ grades give a comparable nBTPT stability on the YaraVera® Amidas product. This experiment shows that the stabilizing effect of $MgSO_4$ on nBTPT on UAS is not 100% based on a pH effect (alkaline pH 8.5 for $MgSO_4$ 99.5% versus acidic pH 6.1 for $MgSO_4$ 99.999%) and also not 100% based on the waterbinding effect of anhydrous $MgSO_4$ as $MgSO_4 \cdot 7H_2O$ delivers similar nBTPT stability. $Na_2SO_4$ actually has a negative effect on the stability of nBTPT. This shows the unique stabilizing effect of magnesium sulphate.

Experiment 4 (Effect of Addition of Oxides and Synergetic Effect of $MgSO_4$ and MgO)

This experiment shows the effect of the addition of a small amount of oxide to the stabilizer. Small amounts of $MgSO_4$, which have little effect, become very effective in a combination with MgO (see D versus F). The effect is synergetic (see C+D versus F) and not additive. There is almost no difference in stability depending on the method of combining the components of the stabilizer composition (i.e. adding the components one by one in any order/making a pre-mix of the components and adding the pre-mix to UAS). MgO was found more effective than CaO, but it is assumed that any alkaline or alkaline-forming compound, selected from the group of calcium oxide, zinc oxide, magnesium oxide, calcium carbonate, and mixtures thereof, is effective.

Aspects of the Invention

Further to the description above and the appended claims, the following aspects of the invention are considered:

Aspect 1. A solid, particulate urea-based blend composition comprising a urea-based compound in particulate form, one or more components in particulate form, selected from the group of nitrates, phosphates, sulphates and chlorides, and a urease inhibitor of the type phosphoric triamide, wherein the urea-based blend composition is further characterized in that it comprises a magnesium sulphate.

Aspect 2. The urea-based blend composition according to aspect 1, characterized in that the magnesium sulphate is present in the composition at a level of 0.0001 to 5 weight %, preferable 0.02 to 1 weight %, most preferably 0.05 to 1 weight %, relative to the total weight of the composition.

Aspect 3. The urea-based blend composition according to any one of aspects 1 to 2, wherein the magnesium sulphate is selected from the group of anhydrous, mono-, di-, tri-, tetra-, penta-, hexa-, heptahydrate, and mixtures thereof.

Aspect 4. The urea-based blend composition according to aspect 3, wherein the magnesium sulphate has a purity of >70%, preferably >80%, more preferably >90%, most preferably >99%.

Aspect 5. The urea-based blend composition according to any one of aspects 1 to 4, characterized in that the urease inhibitor of the type phosphoric triamide is a compound of formula I:

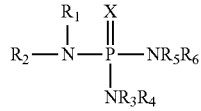

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system; and
$R_3$, $R_4$, $R_5$ and $R_6$ are individually hydrogen or alkyl having 1 to 6 carbon atoms, and alkyl, cycloalkenyl, aralkyl, aryl, alkenyl, alkynyl, and cycloalkyl refer to compounds having from 1 to 10 carbon atoms, preferably from 1 to 6 carbon atoms.

Aspect 6. The urea-based blend composition according to any one of aspects 1 to 5, wherein the urease inhibitor is N-(n-butyl) thiophosphoric triamide (nBTPT).

Aspect 7. The urea-based blend composition according to any one of aspects 1 to 6, wherein the urease inhibitor, in particular N-(n-butyl) thiophosphoric triamide (nBTPT) is present at a level of 0.0001 to 1 weight %, preferable 0.02 to 0.2% weight %, most preferably 0.03 to 0.06 weight %, relative to the total weight of the urea-based blend composition.

Aspect 8. The urea-based blend composition according to any one of aspects 1 to 7, wherein the weight ratio of urease inhibitor of the type phosphoric triamide to magnesium sulphate ranges from 1:20 to 1:1, preferably from 1:15 to 1:1, more preferably from 1:10 to 1:1.

Aspect 9. The urea-based blend composition according to any one of aspects 1 to 8, wherein the urease inhibitor of the type phosphoric triamide is applied onto the urea-based blend composition in liquid or in particulate form, is melt-mixed with a component of the urea-based blend composition, or a combination thereof.

Aspect 10. The urea-based blend composition according to any one of aspects 1 to 9, wherein the urea-based blend composition further comprises an alkaline or alkaline-forming compound, selected from the group of calcium oxide, zinc oxide, magnesium oxide, calcium carbonate, and mixtures thereof.

Aspect 11. The urea-based blend composition according to aspect 10, wherein the weight ratio of alkaline or alkaline-forming compound to magnesium sulphate ranges from 1:20 to 1:2, preferably from 1:15 to 1:2, more preferably from 1:10 to 1:2.

Aspect 12. The urea-based blend composition according to any one of aspects 1 to 11, characterized in that the urea-based blend composition further comprises anti-caking and/or moisture-repellent and/or anti-dust material, preferably applied as a coating to the urea ammonium particulate material.

Aspect 13. The urea-based blend according to aspect 12, wherein the anticaking and/or moisture-repellent coating comprising at least a non-polar material, in particular a liquid organic material, such as an oil, wax, resin or the like and any mixture thereof and is present in the composition at a level of 0.0001 to 1 weight %, preferable 0.02 to 0.5 weight %, most preferably 0.1 to 0.2 weight %, relative to the total weight of the composition.

Aspect 14. The urea-based blend composition according to any one of aspects 1 to 13, wherein the urea-based compound is selected from the group of urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), or mixtures thereof.

Aspect 15. The urea-based blend composition according to any one of aspects 1 to 14, wherein the one or more components in particulate form, selected from the group of nitrates, phosphates, sulphates and chlorides are selected from the group of: ammonium nitrate, calcium nitrate, calcium ammonium nitrate, sodium nitrate, ammonium sulphate nitrate, potassium ammonium nitrate, ammonium phosphate, such as mono-ammonium phosphate (MAP) and di-ammonium phosphate (DAP), calcium bis(dihydrogen orthophosphate), super phosphate, triple superphosphate (TSP), rock phosphate, potassium sulphate, potassium magnesium sulphate, ammonium sulphate (AS), potassium chloride (MOP), or mixtures thereof.

Aspect 16. The urea-based blend composition according to any one of aspects 1 to 15, wherein the composition comprises from about 1 to 60 weight % of one or more components in particulate form, selected from the group of nitrates, phosphates, sulphates and chlorides.

Aspect 17. The urea-based blend composition according to any one of aspects 1 to 16, characterized in that the average particle size (dp50) of the particulate components is between 1 mm and 5 cm, as determined by mesh sieve screening.

Aspect 18. The urea-based blend composition according to any one of aspects 1 to 17, wherein the composition contains:
- 40 to 99 weight % of a urea-based compound in particulate form;
- 1 to 60 weight % of one or more components in particulate form, selected from the group of nitrates, phosphates, sulphates and chlorides;
- 0.03 to 0.06 weight % of nBTPT;
- 0.05 to 0.1 weight % of a magnesium sulphate; and
- 0.015 to 0.03 weight % of magnesium oxide, adding up to 100 weight %, being the total weight of the composition.

Aspect 19. The urea-based blend composition according to any one of aspects 1 to 18, comprising urea in particulate form either coated or melt-mixed with a urease inhibitor of the type phosphoric triamide, in particular N-(n-butyl) thiophosphoric triamide (nBTPT), ammonium phosphate (MAP or DAP) in particulate form, potassium chloride (MOP), and a magnesium sulphate.

Aspect 20. The urea-based blend composition according to any one of aspects 1 to 19, comprising urea in particulate form either coated or melt-mixed with a urease inhibitor of the type phosphoric triamide, in particular N-(n-butyl) thiophosphoric triamide (nBTPT), ammonium sulphate (AS) in particulate form, and a magnesium sulphate.

Aspect 21. Use of the solid, particulate urea-based blend composition as aspected in anyone of aspects 1 to 20 as a fertilizer, in particular for supporting the growth of agricultural products on a sulphur—deficient soil, a phosphor—deficient soil and/or a potassium—deficient soil.

Aspect 22. Use of the solid, particulate urea-based blend composition as cited in anyone of aspects 1 to 20 as an animal feed.

Aspect 23. A method for the manufacture of a solid, particulate urea-based blend composition according to any one of aspects 1 to 20, the method comprising the steps of:
1) providing a urea-based compound in particulate form;
2) providing one or more components in particulate form, selected from the group of nitrates, phosphates, sulphates and chlorides;
3) providing 0.0001 to 5 weight %, relative to the total weight of the composition, of a magnesium sulphate;
4) providing 0.0001 to 1 weight %, relative to the total weight of the composition, of a urease inhibitor of the type phosphoric triamide, preferably N-(n-butyl) thiophosphoric triamide (nBTPT);
5) optionally, providing 0.0001 to 1 weight %, relative to the total weight of the composition, of an alkaline or alkaline-forming compound, selected from the group of calcium oxide, zinc oxide, magnesium oxide, calcium carbonate, and mixtures thereof;
6) optionally, providing coating material wherein the coating material is able to increase at least the anticaking and/or moisture repellence and/or anti-dust properties of said urea-based blend composition; and
7) mixing the components provided in steps 1), 2), 3), 4), 5) and 6) in any order.

Aspect 23. A kit of parts, comprising an amount of:
a) a magnesium sulphate;
b) a urease inhibitor of the type phosphoric triamide, preferably N-(n-butyl) thiophosphoric triamide (nBTPT);
c) optionally, an alkaline or alkaline-forming compound, selected from the group of calcium oxide, zinc oxide, magnesium oxide, calcium carbonate, and mixtures thereof, and
d) optionally, one or more anti-caking and/or moisture-repellent and/or anti-dust compounds.

Aspect 24. Method for improving the stability of a urease inhibitor of the type phosphoric triamide, in particular N-(n-butyl) thiophosphoric triamide, (nBTPT) in a particulate urea-based blend composition comprising a urea-based compound in particulate form, one or more components in particulate form, selected from the group of nitrates, phosphates, sulphates and chlorides and said urease inhibitor by the addition to said composition of 0.0001 to 5 weight %, relative to the total weight of the composition, of a magnesium sulphate.

The invention claimed is:

1. A particulate urea-based blend composition comprising:
   40 to 99 weight % of an urea-based compound in particulate form;
   1 to 60 weight % of at least one component in particulate form selected from the group consisting of nitrates, phosphates, sulphates and chlorides;
   0.0001 to 1 weight % of a phosphoric triamide urease inhibitor;
   0.02 to 1 weight % of magnesium sulphate; and
   an amount of an alkaline or alkaline-forming compound selected from the group consisting of calcium oxide, zinc oxide, magnesium oxide, calcium carbonate, and mixtures thereof, such that the weight ratio of the alkaline or alkaline-forming compound to magnesium sulphate ranges from 1:20 to 1:2;
adding up to 100 weight %, being the total weight of the composition.

2. The urea-based blend composition according to claim 1, wherein the urease inhibitor is present at a level of 0.02 to 0.2 weight % relative to the total weight of the urea-based blend composition.

3. The urea-based blend composition according to claim 2, wherein the urease inhibitor is N-(n-butyl) thiophosphoric triamide (nBTPT).

4. The urea-based blend composition according to claim 2, wherein the level of urease inhibitor is from 0.03 to 0.06 weight %.

5. The urea-based blend composition according to claim 1, wherein the weight ratio of alkaline or alkaline-forming compound to magnesium sulphate ranges from 1:15 to 1:2.

6. The urea-based blend composition according to claim 5, wherein the weight ratio of alkaline or alkaline-forming compound to magnesium sulphate ranges from 1:10 to 1:2.

7. The urea-based blend composition according to claim 1, comprising urea in particulate form either coated or melt-mixed with a phosphoric triamide urease inhibitor, ammonium phosphate (MAP or DAP) in particulate form, potassium chloride (MOP), and a magnesium sulphate.

8. The urea-based blend composition according to claim 7, wherein the urease inhibitor is N-(n-butyl)-thiophosphoric triamide.

9. The urea-based blend composition according to claim 1, comprising urea in particulate form either coated or melt-mixed with a phosphoric triamide urease inhibitor, ammonium sulphate (AS) in particulate form, and a magnesium sulphate.

10. The urea-based blend composition according to claim 9, wherein the urease inhibitor is N-(n-butyl)-thiophosphoric triamide.

11. The urea-based blend composition according to claim 1, wherein the magnesium sulphate is present in the composition at a level of 0.05 to 1 weight %, relative to the total weight of the composition.

12. The urea-based blend composition according to claim 1, wherein the magnesium sulphate is selected from the group consisting of anhydrous, mono-, di-, tri-, tetra-, penta-, hexa-, heptahydrate, and mixtures thereof.

13. The urea-based blend composition according to claim 1, wherein the phosphoric triamide urease inhibitor is a compound of formula I:

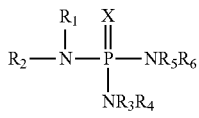

Formula I wherein:
X is oxygen or sulphur;
$R_1$ is alkyl, cycloalkenyl, aralkyl, aryl, alkenyl, alkynyl, or cycloalkyl;
$R_2$ is hydrogen, alkyl, cycloalkenyl, aralkyl, aryl, alkenyl, alkynyl, or cycloalkyl, or $R_1$ and $R_2$ together may form an alkylene or alkenylene chain which may optionally include one or more heteroatoms of divalent oxygen, nitrogen or sulphur completing a 4, 5, 6, 7, or 8 membered ring system;
$R_3$, $R_4$, $R_5$ and $R_6$ are individually hydrogen or alkyl having 1 to 6 carbon atoms, and
alkyl, cycloalkenyl, aralkyl, aryl, alkenyl, alkynyl, and cycloalkyl refer to compounds having from 1 to 10 carbon atoms.

14. The urea-based blend composition according to claim 1, wherein the urease inhibitor is N-(n-butyl) thiophosphoric triamide (nBTPT).

15. The urea-based blend composition according to claim 1, wherein the alkaline or alkaline-forming compound is magnesium oxide.

16. The urea-based blend composition according to claim 1, wherein the urea-based compound is selected from urea, urea calcium sulphate (UCaS), urea calcium nitrate (UCaN), urea magnesium nitrate (UMgN), urea calcium phosphate (UCaP), urea magnesium phosphate (UMgP), urea superphosphate (USP), urea calcium ammonium nitrate (UCAN), urea ammonium sulphate (UAS), urea ammonium phosphate (UAP), urea potassium salts (UK), or mixtures thereof.

17. The urea-based blend composition according to claim 1, wherein the at least one component in particulate form is selected from the group consisting of ammonium nitrate, calcium nitrate, calcium ammonium nitrate, sodium nitrate, ammonium sulphate nitrate, potassium ammonium nitrate, ammonium phosphate, calcium bis(dihydrogen orthophosphate), super phosphate, triple superphosphate (TSP), rock phosphate, potassium sulphate, potassium magnesium sulphate, ammonium sulphate (AS), potassium chloride (MOP), and mixtures thereof.

18. The urea-based blend composition according to claim 1 wherein the composition contains:
40 to 99 weight % of a urea-based compound in particulate form;
1 to 60 weight % of one or more components in particulate form, selected from the group consisting of nitrates, phosphates, sulphates and chlorides;
0.03 to 0.06 weight % of nBTPT;
0.05 to 0.1 weight % of a magnesium sulphate; and
0.015 to 0.03 weight % of magnesium oxide,
adding up to 100 weight %, being the total weight of the composition.

19. A method comprising treating a soil with the particulate urea-based blend composition as claimed in claim 1 as a fertilizer.

20. A method for the manufacture of a particulate urea-based blend composition according to claim 1, the method comprising the steps of:
1) providing 40 to 99 weight % of the urea-based compound in particulate form;
2) providing 1 to 60 weight % of the at least one component in particulate form selected from the group consisting of nitrates, phosphates, sulphates and chlorides;
3) providing 0.02 to 1 weight %, relative to the total weight of the composition, of a magnesium sulphate;
4) providing 0.0001 to 1 weight %, relative to the total weight of the composition, of a phosphoric triamide urease inhibitor;
5) providing an amount of the alkaline or alkaline-forming compound, selected from the group consisting of calcium oxide, zinc oxide, magnesium oxide, calcium carbonate, and mixtures thereof, such that the weight ratio of said alkaline or alkaline-forming compound to magnesium sulphate ranges from 1:20 to 1:2;
6) optionally, providing coating material wherein the coating material is able to increase at least the anticaking and/or moisture repellence and/or anti-dust properties of said urea-based blend composition; and 7) mixing the components provided in steps 1), 2), 3), 4), 5) and 6) in any order.

21. The method according to claim 20, wherein the urease inhibitor is N-(n-butyl) thiophosphoric triamide.

22. A kit of parts, comprising an amount of:
a) a phosphoric triamide urease inhibitor;
b) a magnesium sulphate, such that the weight ratio of the phosphoric triamide urease inhibitor to magnesium sulphate ranges from 1:20 to 1:1;
c) an alkaline or alkaline-forming compound, selected from the group consisting of calcium oxide, zinc oxide, magnesium oxide, calcium carbonate, and mixtures thereof, such that the weight ratio of said alkaline or alkaline-forming compound to magnesium sulphate ranges from 1:20 to 1:2; and
d) optionally, at least one anti-caking and/or moisture-repellent and/or anti-dust compounds.

23. The kit according to claim 22, wherein the urease inhibitor is N-(n-butyl) thiophosphoric triamide.

24. The kit according to claim 22, wherein the weight ratio of the phosphoric triamide urease inhibitor to magnesium sulphate ranges from 1:10 to 1:1.

25. The kit according to claim 22, wherein the alkaline or alkaline-forming compound is magnesium oxide.

26. A method for improving the stability of a phosphoric triamide urease inhibitor in a particulate urea-based blend composition comprising a urea-based compound in particulate form, at least one component in particulate form selected from the group consisting of nitrates, phosphates, sulphates and chlorides and said urease inhibitor, the method comprising adding a stabilizer to the composition, the stabilizer comprising from 0.02 to 1 weight % of a magnesium sulphate, relative to the total weight of the composition, and an amount of alkaline or alkaline-forming compound selected from the group consisting of calcium oxide, zinc oxide, magnesium oxide, calcium carbonate, and mixtures thereof, such that the weight ratio of said alkaline or alkaline-forming compound to magnesium sulphate ranges from 1:20 to 1:2.

27. The method of claim 26, wherein the urease inhibitor is N-(n-butyl)-thiophosphoric triamide.

* * * * *